No. 610,891. Patented Sept. 20, 1898.
J. D. BRAINARD.
CURRYCOMB.
(Application filed Feb. 27, 1897.)
(No Model.) 2 Sheets—Sheet 2.
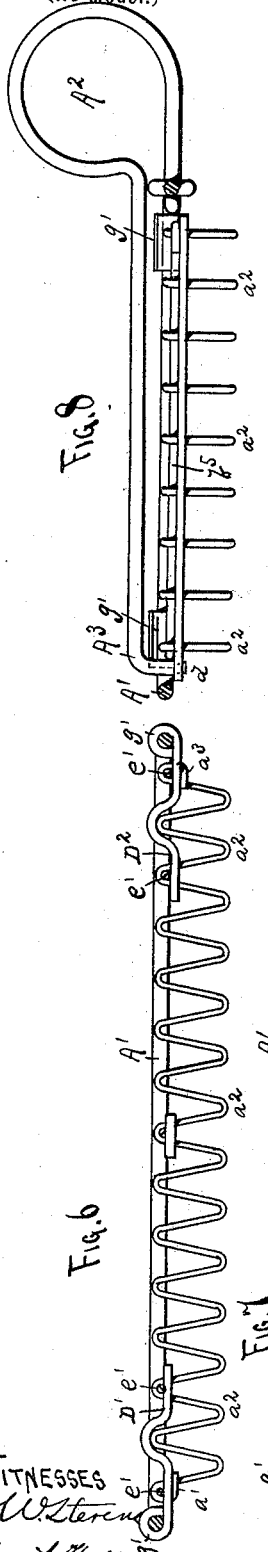
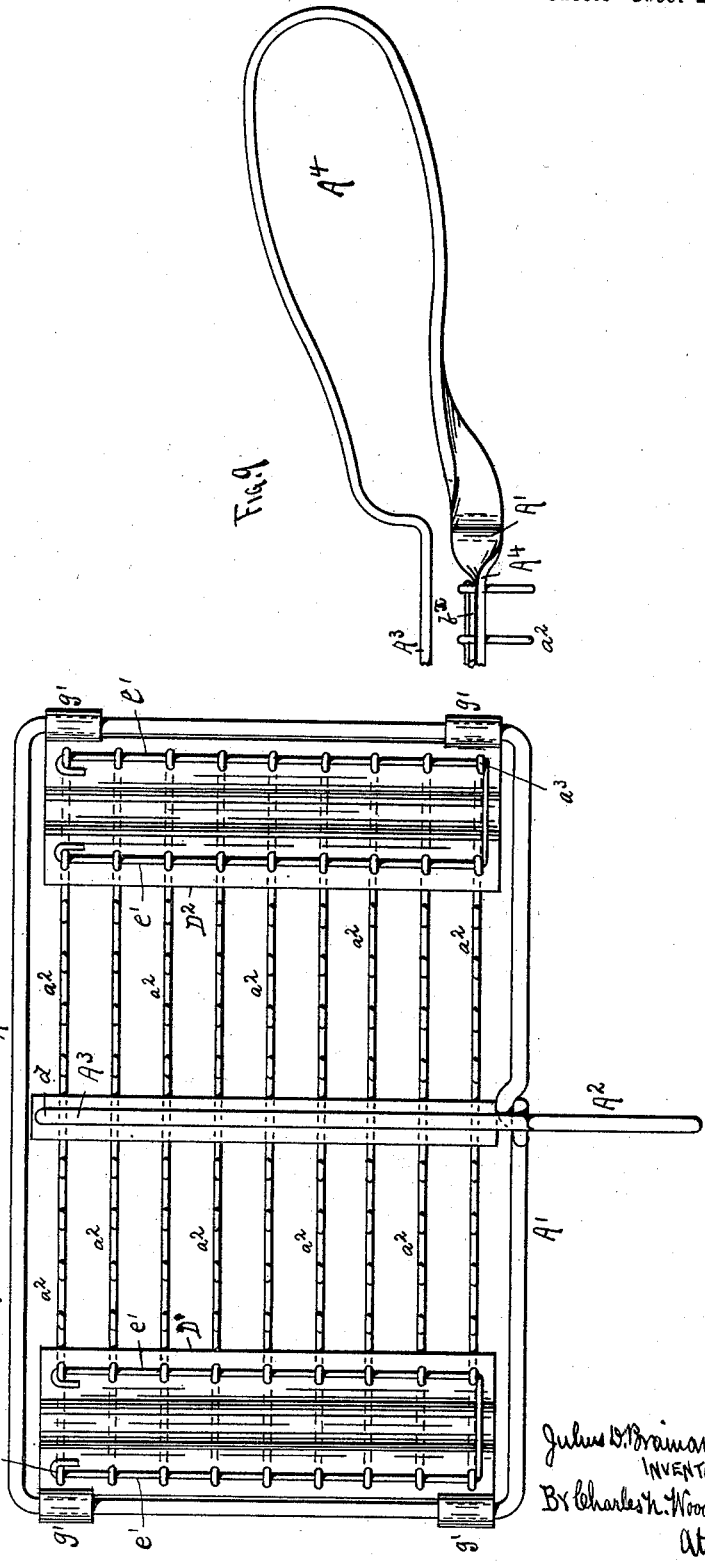
Witnesses
Julius D. Brainard
INVENTOR
By Charles N. Woodward
Atty.
THE NORRIS PETERS CO., PHOTO-LITHO., WASHINGTON, D. C.

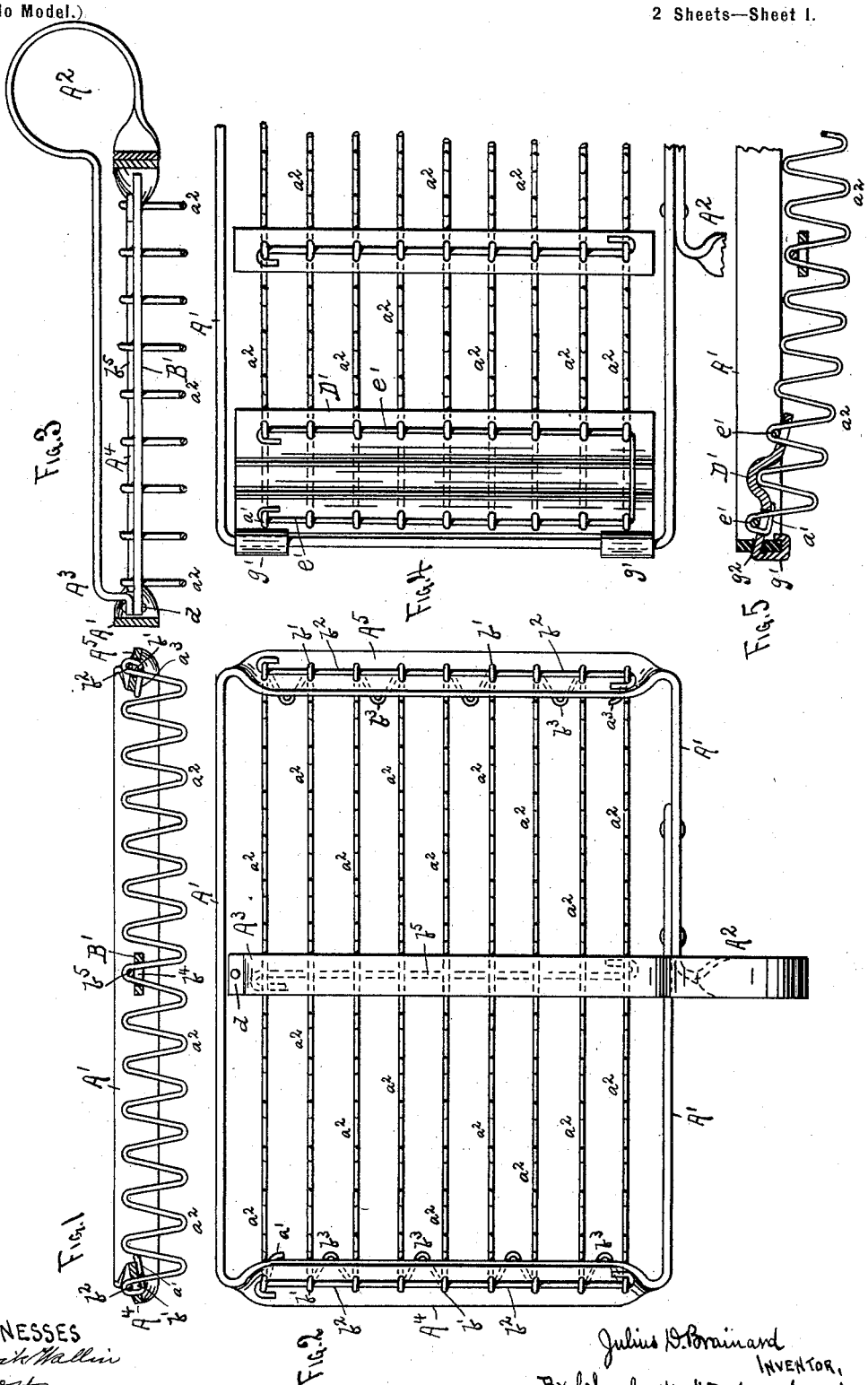

UNITED STATES PATENT OFFICE.

JULIUS D. BRAINARD, OF ST. PAUL, MINNESOTA.

CURRYCOMB.

SPECIFICATION forming part of Letters Patent No. 610,891, dated September 20, 1898.

Application filed February 27, 1897. Serial No. 625,309. (No model.)

*To all whom it may concern:*

Be it known that I, JULIUS D. BRAINARD, a citizen of the United States, residing at St. Paul, in the county of Ramsey and State of Minnesota, have made certain new and useful Improvements in Currycombs, of which the following is a specification.

This invention relates to currycombs; and it consists in the construction, combination, and arrangement of parts, as hereinafter shown and described, and specifically pointed out in the claims.

In the drawings, Figure 1 is a longitudinal sectional side elevation. Fig. 2 is a plan view, and Fig. 3 is a cross-sectional view, of my improved currycomb. Fig. 4 is a plan view of a portion of a currycomb, illustrating a modification in the construction. Fig. 5 is a cross-sectional view of the parts shown in Fig. 4. Figs. 6, 7, and 8 are views similar to Figs. 1, 2, and 3, illustrating another modification in the construction. Fig. 9 is a sectional detail illustrating a modification in the manner of arranging the handle.

The teeth of the comb are formed of wire bent to a somewhat-pointed form where presented to the body of the horse and supported in a suitable framework. The teeth will preferably be formed from one single piece of wire, commencing at $a'$, (see Fig. 1,) and bent back and forth in the form shown in Figs. 1, 5, and 6, and somewhat-pointed at the junction of the bends at $a^2$, and ending at $a^3$.

$A'$ is the supporting-frame, which will preferably be of oblong or flat wire, as in Figs. 1, 2, 3, 4, and 5, but may be of round wire, as in Figs. 6, 7, and 8, and the frame will preferably be oblong in shape and with a thumb-loop $A^2$, turned up on one side, and with the end $A^3$ continued across above the frame nearly to the other side, as shown.

When the flat wire is employed, as in Figs. 1, 2, and 3, the ends $A^4 A^5$ will be turned at an angle, as shown, and provided with perforations $b'$, through which the upper loop of the end teeth are passed and secured in place by a wire $b^2$, passing through the loops and with the loop which connects the ends of the rows of teeth bent inward beneath the ends $A^4 A^5$, as shown at $b^3$. By this simple means the rows of teeth are all firmly secured to the framework in parallel rows, with the points $a^2$ in uniform order.

$B'$ is a plate formed with perforations $b^4$, corresponding to the perforations $b'$ in the ends $A^4 A^5$, and up through which the upper ends or bends of the center tooth of each row is passed and secured by a wire $b^5$ passed through the loops and with its ends bent around, as shown, the plate $B'$ thus forming a cross-bar to support and stiffen the rows of teeth and prevent undue side movement. Two or more of the bars $B'$ may be employed, if required. The end $A^3$, as before stated, is extended across the frame, and its outer end will be bent down and secured to the cross-bar $B'$, as shown at $d$, to increase the stiffness and support the rows of teeth more fully.

When the flat wire is employed, as in Figs. 1, 2, 3, 4, and 5, the side members may be used as scrapers to remove adhering particles of dried matter from the horse, especially from around the fetlocks. By bending the end members $A^4 A^5$ the portions of the teeth projecting below the frame are increased, so as to increase the efficiency of the comb when used upon manes and tails of horses.

In Figs. 6, 7, and 8 I have shown the frame $A'$ made of round wire and with plates $D' D^2$ secured to the teeth by perforations and wires $e'$, passed through the loops of the teeth, which project up through the perforations. Each of the plates $D' D^2$ has two wings $g'$ projecting therefrom and adapted to be wrapped around the end members of the frame to secure the plates and the connected teeth in place. Plates $D' D^2$ enable me to grip several rows of teeth.

In Figs. 4 and 5 the same form of plate $D'$ or $D^2$ is used as in Figs. 6, 7, and 8; but in this modification the frame is of the flat-wire form and with the projections $g'$ passed through slots $g^2$ in the frame and bent downward around the lower part of the frame. By this means a strain can be imparted to the rows of teeth to curve them outward, so as to present a convex surface upon the outer or working side of the comb, as shown in Fig. 5.

In Fig. 9 the end of the frame before being passed over the top to the point $A^3$ $d$ is bent into the form of a handle $A^4$, which may be required under some circumstances.

Having thus described my invention, what I claim as new is—

1. In a currycomb, the teeth formed of a single piece of wire bent into V shape and arranged in parallel rows by bending back and forth, a frame having perforations in the members next the ends of the rows of teeth adapted to receive the upper bends of the teeth at the ends of the rows, and binding-wires passed through said bends above said end members, a cross-bar having perforations adapted to receive the upper bends of the central tooth of each parallel row, and a binding-wire passed through said bends above said cross-bar, substantially as hereinbefore set forth.

2. In a currycomb, the teeth formed of a single piece of wire bent into V shape and arranged in parallel rows by bending back and forth, a frame having perforations in the members next the ends of the rows of teeth adapted to receive the upper bends of the teeth at the ends of the rows, and binding-wires passed through said bends above said end members, the loops connecting the ends of the rows being crimped around the end members of the frame, substantially as hereinbefore set forth.

3. In a currycomb, the teeth formed of a single piece of wire bent into V shape and arranged in parallel rows by bending back and forth, a frame having perforations in the members next the ends of the rows of teeth adapted to receive the upper bends of the teeth at the ends of the rows, and binding-wires passed through said bends above said end members, a cross-bar having perforations adapted to receive the upper bends of the central tooth of each parallel row, and means for securing said teeth in said cross-bar, there being an extension of said frame connected to said cross-bar, substantially as hereinbefore set forth.

4. In a currycomb, the teeth formed of a single piece of wire, bent into V shape, and arranged in parallel rows by bending back and forth, the ends of the rows being secured in a supporting-frame, the end members of said frame being turned flatwise to enable the implement to be employed with greater efficiency upon the manes and tails of horses, substantially as hereinbefore set forth.

In testimony whereof I have hereunto set my hand, in the presence of two subscribing witnesses, this 11th day of June, A. D. 1896.

JULIUS D. BRAINARD.

In presence of—
C. N. WOODWARD,
LEWIS D. MANN.